United States Patent [19]

Goetz

[11] Patent Number: 4,919,379
[45] Date of Patent: Apr. 24, 1990

[54] UNIVERSAL CLAMPING FIXTURE FOR BABY CARRIAGE UMBRELLAS

[76] Inventor: Kurt A. Goetz, Aumuehle Container Terminal, D-8700 Wurzburg, Fed. Rep. of Germany

[21] Appl. No.: 307,774

[22] Filed: Feb. 7, 1989

[30] Foreign Application Priority Data

Jun. 25, 1988 [DE] Fed. Rep. of Germany ....... 8808262

[51] Int. Cl.⁵ ............................................. A44B 21/00
[52] U.S. Cl. ................................. 248/231.6; 24/521; 24/569
[58] Field of Search ................. 248/231.5, 231.6, 540, 248/541; 24/525, 569, 521, 507, 564

[56] References Cited

U.S. PATENT DOCUMENTS

| | | | |
|---|---|---|---|
| 158,115 | 12/1874 | Pairo | 24/569 |
| 2,080,261 | 5/1937 | Funk | 248/231.5 |
| 2,662,715 | 12/1953 | McKnight | 248/231.6 |
| 2,740,644 | 4/1956 | Ring | 248/231.6 |
| 2,792,581 | 5/1957 | Woyton | 24/569 |
| 2,994,501 | 8/1961 | Barnard | 248/231.6 |
| 3,934,283 | 1/1976 | Raffel | 24/569 |
| 3,950,874 | 4/1976 | Diggs | 248/540 |
| 4,512,277 | 4/1985 | Williams | 248/231.6 |
| 4,616,384 | 10/1986 | Lowell | 24/525 |

FOREIGN PATENT DOCUMENTS

| | | | |
|---|---|---|---|
| 639411 | 4/1962 | Canada | 248/231.6 |
| 601282 | 1/1960 | Italy | 248/541 |

*Primary Examiner*—Ramon O. Ramirez
*Assistant Examiner*—Robert A. Olson
*Attorney, Agent, or Firm*—Arnold, White & Durkee

[57] ABSTRACT

This invention is a universal clamping fixture for attaching umbrellas, parasols, sunscreens and the like to baby carriages or strollers.

7 Claims, 3 Drawing Sheets

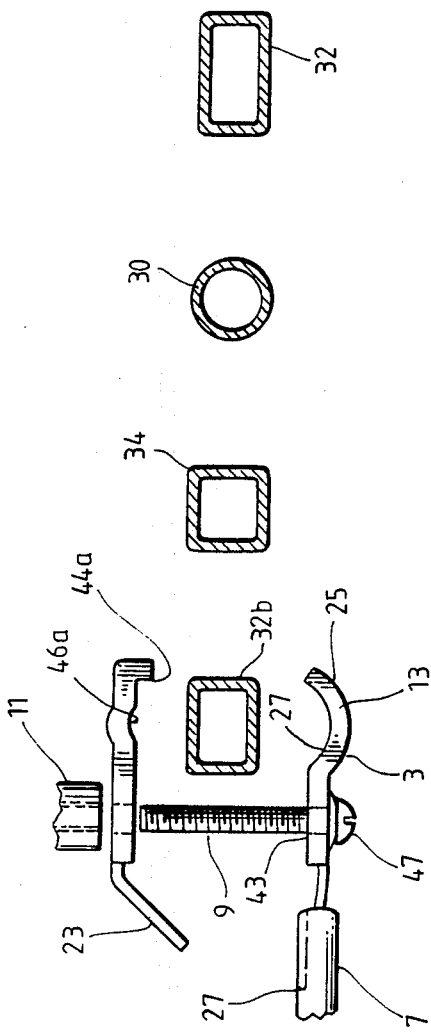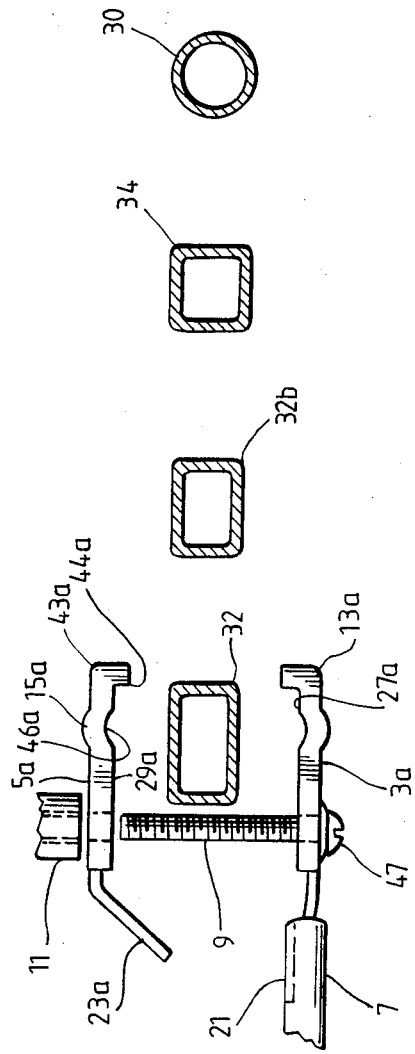

UNIVERSAL CLAMPING FIXTURE FOR BABY CARRIAGE UMBRELLAS

BACKGROUND OF THE INVENTION

Even before the invention of the baby carriage, mothers have faced the problem of keeping direct sunlight, wind and rain from striking their small children when those children are outside. One solution is to place a blanket loosely over the child. This is fine in the winter but uncomfortable on hot days and even dangerous when used to protect the child's face. Far more common and practical is the use of an umbrella or parasol. The umbrella can be held by the person in charge of the child's outing or, in the case of an older child, by the child himself. Since the advent of baby carriages and strollers, a more acceptable method of holding the umbrella has been to clamp it directly to the baby carriage or stroller in which the child is riding. Clamps to perform this function are not new, but existing clamps have deficiencies. They do not hold the umbrella securely enough. They are adapted to clamp to one particular type of baby carriage or stroller or even to one particular area of a baby carriage or stroller and they cannot be easily transferred from one baby vehicle to another. The clamps are either too bulky or too flimsy and thus difficult to use. Metal clamps scar and damage the objects they are clamped to and plastic clamps do not hold up to the stresses placed on them.

SUMMARY OF THE PRESENT INVENTION

The present invention is a universal clamping fixture which can be adapted to be used with any type of parasol or umbrella and with most types of baby carriages and strollers. Baby carriages and strollers generally have frames made of round, square or rectangular structural tubing or rod. This invention has two universal jaws which can have a variety of interchangeable configurations described in more detail below. The jaws are held together and can be quickly and firmly clamped to virtually any known baby carriage frame shape by means of a bolt through the jaws and a large wing nut. The surface of the baby carriage frame is protected by member protectors which are soft relative to the material of the jaws and frame.

DESCRIPTION OF THE DRAWINGS

FIG. 6 is a partial top view of the embodiment of FIG. 2 shown with four different cross sections of typical structural shapes used for baby carriage frames.

FIG. 7 is a partial top view of the embodiment of FIG. 3 and FIG. 5 shown with four different cross sections of typical structural shapes used for baby carriage frames.

DETAILED DESCRIPTION OF THE INVENTION

Figures 1, 2, 3:
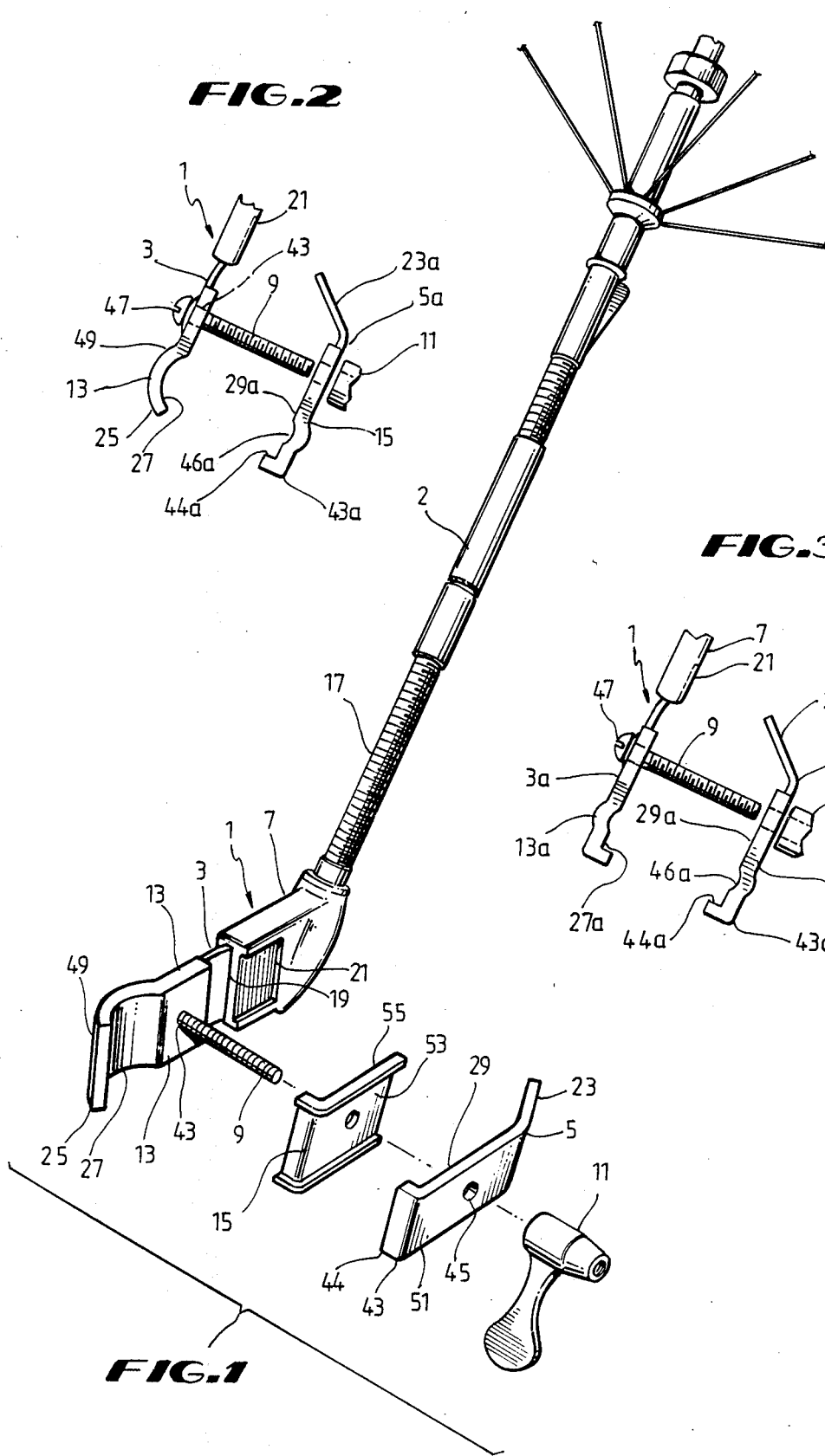
FIG. 1 is an exploded perspective view of one embodiment of the invented clamp shown attached to the shaft of a parasol.
FIG. 2 is a partial top view of a second embodiment of the invented clamp.
FIG. 3 is a partial top view of a third embodiment of the invented clamp.
Figure 4:
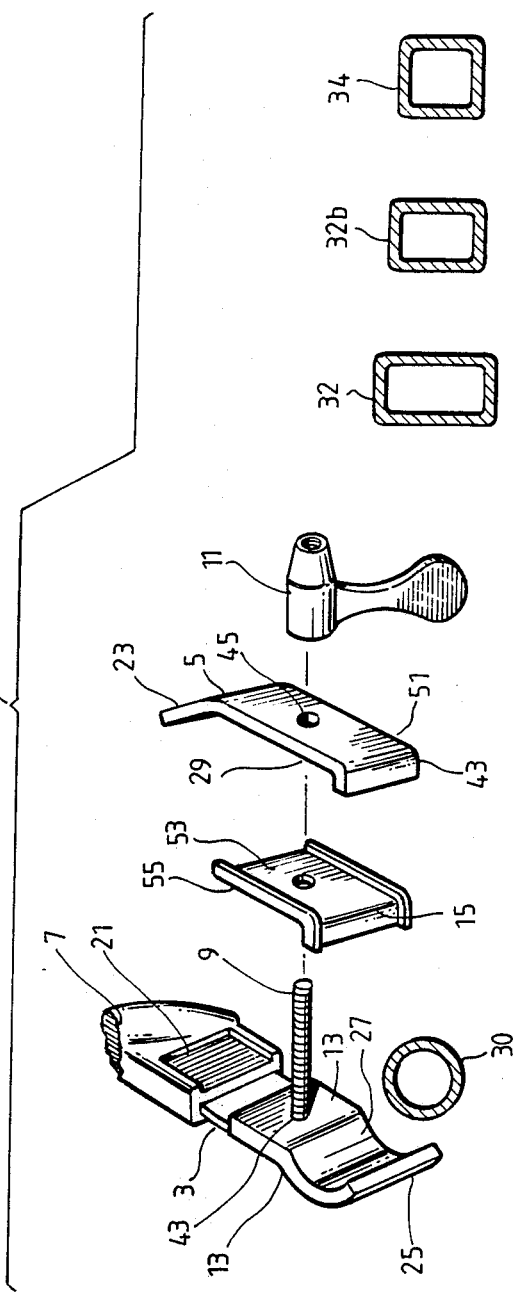
FIG. 4 is an exploded perspective view of the embodiment of FIG. 1 shown with four different cross sections of typical structural shapes used for baby carriage frames.
Figure 5:
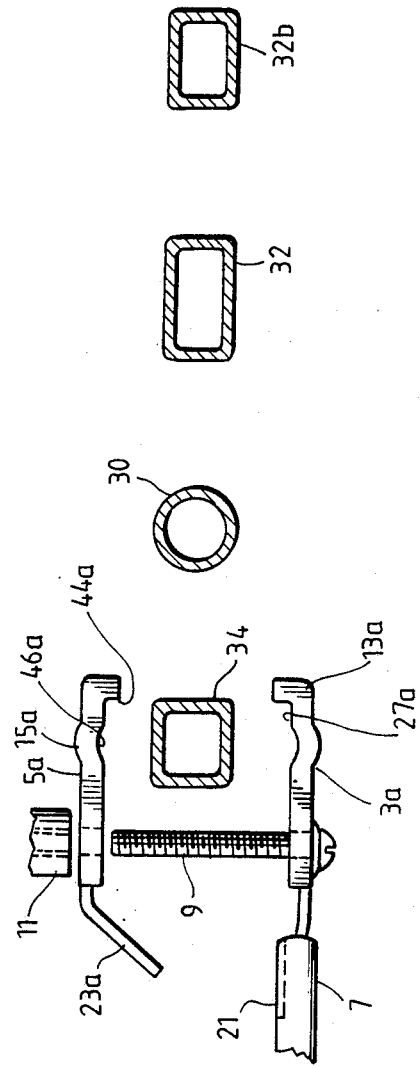
FIG. 5 is a partial top view of the embodiment of FIG. 3 shown with four different cross sections of typical structural shapes used for baby carriage frames.

Refer first to FIG. 1. The principal components of the universal clamping fixture 1 are an umbrella shaft 2, a stationary clamp jaw 3, a movable clamp jaw 5, a clamp body 7, a bolt 9, a wing nut 11 and two member protectors 13 and 15.

The lower end 17 of umbrella shaft 2 is embedded in and thereby attached to clamp body 7. Also embedded in clamp body 7 is one end 19 of stationary clamp jaw 3. The clamp body 7 of this embodiment may be made of molded plastic. The lower end 17 of the umbrella shaft 2 and one end 19 of the stationary clamp jaw 3 are connected by being molded into the molten plastic which forms the clamp body 7. The clamp body 7 includes a notch 21 on one side which receives and locates one end 23 of a movable clamp jaw 5. The end 25 of the stationary clamp jaw 3 which is not embedded in the clamp body 7 is curved. The arcuate shape thus formed on clamping surface 27 of the clamp jaw 3 adapts the jaw to mate with and grasp the exterior surface of a structural tube 30 as shown in FIGS. 4-7.

Used with the stationary curved clamp jaw 3 is a movable clamp jaw 5. The clamping surface 29 of clamp jaw 5 is flat. One end 23 of clamp jaw 5 is bent at an oblique angle toward the stationary clamp jaw 3 so that the end 23 will be received by notch 21 in the clamp body 7 when the clamp 1 is in use. The opposite end 43 of clamp jaw 5 is bent perpendicular to the clamping surface 29 of clamp jaw 5 to form a retaining lip 44 for engaging one side of square or rectangular tubing 34, 32, 32b when an adjacent side is clamped by clamping surface 29 as shown in FIGS. 4-7.

A threaded bolt 9 extends through a hole 43 in the stationary clamp jaw 3 and a hole 45 in the movable clamp jaw 5.

The head 47 of the bolt 9 engages the outer surface 49 of the stationary clamp jaw 3. A wing nut 11 threads onto the bolt 9 and engages the outer surface 51 of movable clamp jaw 5. As the wing nut 11 is screwed onto the bolt 9, the movable jaw 5 is urged toward stationary jaw 3. The bent end 23 of clamp jaw 5 engages the notch 21 in the clamp body 7 and holds the end 23 of clamp jaw 5 in fixed relationship to the clamp body 7 and the stationary clamp jaw 3. As clamp jaw 5 rotates around end 23, the flat clamping surface 29 of clamp jaw 5, the retaining lip 44 of clamp jaw 5, and the arcuate clamping surface 27 of clamp jaw 3 form a universal clamping surface which will clamp onto structural members having any of the common cross sections, circular 30, square 34 or rectangle 32 and 32b shown in FIGS. 4-7.

Because in this embodiment the clamp jaws 3 and 5 are made of metal, they might mar or distort the structural tubing being clamped when the clamp 1 is in use. To prevent this each jaw 3 and 5 is optimally fitted with a member protector 13 and 15 which is softer than either the metal jaw to which it is fitted or the structural member which is to be clamped. The member protectors 13 and 15 of this embodiment are made of molded plastic. Member protector 13 is shown molded around stationary jaw 3 so that the jaw 3 and the protector 13 become a single unit. Member protector 15 is shown as a separate removable piece of plastic which conforms to the clamping surface 29 of jaw 5 on one side 53 and the structural member to be clamped on the other side 55. Either the removable member protector 15 or the integral member protector 13 can be used on either clap jaw. Although not shown, it is contemplated that the member protectors 13 and 15 can have surfaces adapted to clamp a structural member whose shape is not compatible with the clamping surfaces 27 and 29 of the clamping jaws 3 and 5. Thus, a flat surfaced clamp jaw could have a member protector with an arcuate surface and an arcuate surfaced clamp jaw could have a member protector with a flat surface.

Although the embodiment of the clamp 1 shown in FIGS. 1 and 2 uses a stationary clamp jaw 3 with an arcuate clamping surface 27 and a movable clamping jaw 5 with a flat clamping surface 29, a feature of this invention is that the clamping surfaces 13 and 15 of clamp jaws 3 and 5 are interchangeable. Either or both clamping surface may be curved or flat.

FIGS. 2, 4, 5, 6 and 7 show the invented clamp with clamp jaws 3 and 5 having alternative configurations. Refer now to FIG. 2. The movable clamp jaw 5 of FIG. 1 has been replaced with movable clamp jaw 5a. Clamp jaw 5a has one end 23a bent at an oblique angle toward the stationary clamp jaw 3 so that the end 23a will be received by notch 21 in the clamp body 7 when the clamp 1 is in use. The opposite end 43a of clamp jaw 5a is bent perpendicular to the clamping surface 29a to form a retaining lip 44a and spaced from the retaining lip 44a is an arcuate depression 46a in the clamping surface 29a. It can be seen that the clamping surface 29a thus formed is suitable to clamp round, square or rectangular shapes with equal facility. It can be seen from FIGS. 5, 6 and 7 that a clamp jaw 5a having this shape engages or clamps the surface of round, square, or rectangular cross sections with approximately equal clamping surface area and therefore with approximately equal clamping stress. Clamp jaw 5a is shown with a member protector 15a with its same configuration.

FIG. 3 depicts a clamp 1 having a movable clamp jaw 5a as described above and shown in FIG. 2. The clamp 1 in FIG. 3 also has a stationary clamp jaw 3a with a clamping surface 27a configuration the same as the clamping surface 29a of movable clamp jaw 5a. Clamp jaw 3a is shown with a member protector 13a with its same configuration.

All of the clamping surface configurations described above and shown in the figures are interchangeable and may be used in dozens of combinations with each other to clamp virtually every structural shape used in baby carriages. FIGS. 1-7 depict just a few of the possible combinations of clamp surfaces and members which can be satisfactorily clamped.

It should be understood that the foregoing description of the invention is intended merely to be illustrative thereof and that the invention is not confined to the construction and arrangements of parts herein illustrated and described, but embraces all such modified forms thereof as come within the scope of the following claims.

What is claimed is:

1. A universal clamping fixture for baby carriages, comprising:

a clamp body attachable to one end of a shaft;

a stationary clamp jaw having a hole therethrough, a first end, a second end, a clamping surface, and a second surface, the first end being attached to the clamp body and the second end being adapted to interchangeably receive members of round, square or rectangular cross section with equal facility and to transmit approximately equal clamping stresses to members having round, square or rectangular cross sections;

a movable clamp jaw having a hole therethrough, a first end, a second end, a clamping surface, and a second surface, the first end being angled to contact one side of the clamp body and the second end has a flat clamping surface, a retaining lip perpendicular to the flat clamping surface, and an arcuate depression in the flat clamping surface spaced from the retaining lip, said second end being adapted to interchangeably receive members of round, square or rectangular cross section with equal facility, and to transmit approximately equal clamping stresses to members having round, square or rectangular cross sections, and wherein said clamp body includes a depression therein, said first end of said movable clamp jaw engages an edge of said depression so as to pivot thereabout; and means for urging the movable clamp jaw toward the stationary clamp jaw.

2. A universal clamping fixture for baby carriages, comprising:

a clamp body attachable to one end of a shaft;

a stationary clamp jaw having a hole therethrough, a first end, a second end, a clamping surface, and a second surface, the first end being attached to the clamp body and the second end being adapted to interchangeably receive members of round, square or rectangular cross section with equal facility, and to transmit approximately equal clamping stresses to members having round, square or rectangular cross sections;

a movable clamp jaw having a hole therethrough, a first end, a second end, a clamping surface, and a second surface, the first end being angled to contact one side of the clamp body and the second end has a flat clamping surface, a retaining lip perpendicular to the flat clamping surface, and an arcuate depression in the flat clamping surface spaced from the retaining lip, said second end being adapted to interchangeably receive members of round, square or rectangular cross section with equal facility, and to transmit approximately equal clamping stresses to members having round, square or rectangular cross sections, and wherein said clamp body includes a depression therein, said first end of said movable clamp jaw engages an edge of said depression so as to pivot thereabout;

a first member protector adjacent to the clamping surface of the stationary clamp jaw softer than the member, and conforming to the clamping surface of the second clamp jaw;

a second member protector adjacent to the clamping surface of the movable clamp jaw softer than the member, and conforming to the clamping surface of the second clamp jaw;

a threaded bolt having a head in contact with the second surface of the stationary clamp jaw and extending through the hole in the stationary clamp jaw and through the hole in the movable clamp jaw; and, a threaded nut on the threaded bolt and in contact with the second surface of the movable clamp jaw such that rotation of the nut on the bolt will urge the movable clamp jaw toward the stationary clamp jaw.

3. The clamping fixture of claim 2, wherein the member protectors are made of plastic and the clamp jaws are made of metal.

4. The clamping fixture of claim 2, wherein the clamp body, the wing nut, and the member protectors are made of plastic and the bolt and and clamp jaws are made of metal.

5. The clamping fixture of claim 2, wherein at least one member protector is removable from the clamp jaws.

6. The clamping fixture of claim 2, wherein at least one member protector is made integral with the clamp jaws.

7. A universal clamping fixture for clamping umbrella shafts and the like to tubular frame members of baby carriages and the like, comprising:

a body member rigidly attachable to a shaft;

a stationary clamp jaw attachable to the body member and extending from the body member a distance to span the cross section of a tubular member of round, square or rectangular cross section, said stationary clamp jaw having a clamping surface configured to engage and the clamp the outer surface of the tubular member such that the stress imposed on the tubular member is independent of the cross section of the tubular member;

a movable, matching clamp jaw inclined at one end toward the body member to pivotally engage the body member so as to be capable of pivoting toward the stationary clamp jaw, said movable clamp jaw having a flat clamping surface, a retaining lip perpendicular to the flat clamping surface, and an arcuate depression in the flat clamping surface spaced from the retaining lip, said jaw configured to engage the outer surface of the tubular member such that the stress imposed on the tubular member by the movable clamp jaw is independent of the cross section of the tubular member, wherein said clamp body includes a depression therein, said one end of said movable clamp jaw engages an edge of said depression so as to pivot thereabout; and, means for urging the movable clamp jaw toward the stationary clamping jaw.

* * * * *

UNITED STATES PATENT AND TRADEMARK OFFICE
CERTIFICATE OF CORRECTION

PATENT NO. : 4,919,379

DATED : April 24, 1990

INVENTOR(S) : Kurt A. Goetz

It is certified that error appears in the above—identified patent and that said Letters Patent is hereby corrected as shown below:

Column 3, line 3, "clap" should be -- clamp --.

Signed and Sealed this

Twenty-first Day of January, 1992

Attest:

HARRY F. MANBECK, JR.

*Attesting Officer*     *Commissioner of Patents and Trademarks*